(12) United States Patent
McGee et al.

(10) Patent No.: US 6,674,426 B1
(45) Date of Patent: Jan. 6, 2004

(54) AUGMENTING AND NOT REPLACING PAPER BASED WORK PRACTICE VIA MULTI-MODAL INTERACTION

(75) Inventors: David R. McGee, Pasco, WA (US); Philip R. Cohen, Lake Oswego, OR (US); Lizhong Wu, San Diego, CA (US)

(73) Assignee: Oregon Health & Science University, Portland, OR (US)

( * ) Notice: Subject to any disclaimer, the term of this patent is extended or adjusted under 35 U.S.C. 154(b) by 160 days.

(21) Appl. No.: 09/802,156

(22) Filed: Mar. 8, 2001

Related U.S. Application Data

(60) Provisional application No. 60/188,553, filed on Mar. 10, 2000, and provisional application No. 60/188,524, filed on Mar. 10, 2000.

(51) Int. Cl.[7] .................................................. G09G 5/00

(52) U.S. Cl. ........................ 345/173; 345/1.1; 345/1.2; 345/87; 345/178; 178/18.01; 178/18.03; 178/18.1; 178/19.01; 349/5; 349/6; 348/744

(58) Field of Search ............................ 345/1.1, 1.2, 87, 345/178, 173; 178/18.01, 18.03, 18.1, 19.01; 349/5, 6; 348/744

(56) References Cited

U.S. PATENT DOCUMENTS

RE34,476 E * 12/1993 Norwood .................... 382/186
5,317,140 A * 5/1994 Dunthorn .................... 250/221

(List continued on next page.)

OTHER PUBLICATIONS

Wellner, P., Interacting with Paper on the Digital Desk, Communications of the ACM, 1993, 87–96, 36(7).

Ishii, H. and Ullmer, B., Tangible Bits: Towards Seamless Interfaces between People, Bits, and Atoms, Proceedings of the ACM Conference on Human Factors in Computer Systems, Mar. 22–27, 1997, 234–241, ACM Press, CHI 97 Papers.

Streitz, N.A., Geibler, J., and Holmer, T., Roomware for Cooperative Buildings: Integrated Design of Architectural Spaces and Information Spaces, Proceedings of the First International Workshop on Cooperative Buildings: Integrated Information, Organization, and Architecture (CoBuild '98), Feb. 1998, Spring–Verlag, 4–21.

Coen, M. H., Design Principles for Intelligent Environments, Proceedings of the 1998 National Conference on Artificial Intelligence (AAAI–98), Jul. 1998, 547–554.

(List continued on next page.)

Primary Examiner—Bipin Shalwala
Assistant Examiner—Vincent E. Kovalick
(74) Attorney, Agent, or Firm—Baniak Pine & Gannon

(57) ABSTRACT

A method and system designed to augment, rather than replace, the work habits of its users. These work habits include practices such as drawing on Post-it™ notes using a symbolic language. The system observes and understands the language used on the Post-it notes and the system assigns meaning simultaneously to objects in both the physical and virtual worlds. Since the data is preserved in physical form, the physical documents serve as a back-up in the case of electronic system failure. With the present invention users can rollout a primary paper document such as a map, register it, and place secondary physical documents on the map. The secondary physical documents can be moved from one place to another on the primary document. Once an object is augmented, users can modify the meaning represented by it, ask questions about that representation, view it in virtual reality, or give directions to it, all with speech and gestures.

17 Claims, 6 Drawing Sheets

U.S. PATENT DOCUMENTS

| | | | | |
|---|---|---|---|---|
| 5,862,271 | A | | 1/1999 | Petrie .......................... 382/309 |
| 6,100,877 | A | * | 8/2000 | Chery et al. ................. 345/178 |
| 6,124,847 | A | * | 9/2000 | Chery et al. ................. 345/173 |
| 6,249,765 | B1 | * | 6/2001 | Adler et al. ................. 704/500 |
| 6,337,681 | B1 | * | 1/2002 | Martin ......................... 345/178 |
| 6,342,901 | B1 | * | 1/2002 | Adler et al. ................. 345/700 |

OTHER PUBLICATIONS

Moran, T.P., Saund, E., Melle, W.V., Bryll, R., Gujar, A.U., Fishkin, K.P., and Harrison, B.L., The Ins and Outs of Collaborative Walls: Demonstrating the Collaborage Concept, In Proceedings of the ACM Conference on Human Factors in Computer Systems, May 15–20, 1999, 192–193, ACM Press, CHI 99 Extended Abstracts.

Want, R., Fishkin, K.P., Gujar, A.U., and Harrison, B.L., Bridging Physical and Virtual Worlds with Electronic Tags, Proceedings of the ACM Conference on Human Factors in Computer Systems, May 15–20, 1999, 370–377, ACM Press, CHI 99 Extended Abstracts.

Underkoffler, J., and Ishii, H., Urp: A Luminous–Tangible Workbench for Urban Planning and Design, Proceedings of the ACM Conference on Human Factors in Computer Systems, May 15–20, 1999, 386–393, ACM Press, CHI 99 Extended Abstracts.

* cited by examiner

Typed feature structure from spoken structure
resulting from utterance "Advanced guard."

Typed feature structure resulting from
drawing recon company.

Multimodal grammar rule for partial unit fusion.

AUGMENTING AND NOT REPLACING PAPER BASED WORK PRACTICE VIA MULTI-MODAL INTERACTION

CROSS REFERENCE TO RELATED APPLICATIONS

Priority is claimed for the following applications:
1) Co-pending application serial number 60/188,524 filed 3/10/00.
2) Co-pending application serial Number 60/188,553 filed 3/10/00. +gi

STATEMENT CONCERNING FEDERALLY SPONSORED RESEARCH

The development of this invention was in part supported by government contracts administered by the Information Systems Office of DARPA under contract number N66001-99-D-8503, and also in part by ONR grants: N00014-95-1-1164, N00014-99-1-0377, and N00014-99-1-0380.

COMPUTER PROGRAM LISTING APPENDIX AND TO OTHER APPENDICES

Appendix A is "Computer Program Listing Appendix" on a CD (Compact Disk). containing the following 17 text files consisting of 18427730 bytes.

| File Name | File Size | Creation Date |
| --- | --- | --- |
| aaaAgents.uue | 200782 | 03/01/2001 |
| aaaLib.uue | 188119 | 03/01/2001 |
| blank_bmp.uue | 135554 | 03/05/2001 |
| blank_map.uue | 56 | 03/05/2001 |
| bridge.uue | 1930063 | 03/05/2001 |
| coord_rdr.uue | 44300 | 03/05/2001 |
| EggTimer.uue | 45179 | 03/05/2001 |
| GateKeeper.uue | 94929 | 03/01/2001 |
| Gesture.uue | 10643440 | 03/01/2001 |
| mm_ogi_nl.uue | 2031646 | 03/05/2001 |
| multiparse.uue | 1980857 | 03/05/2001 |
| QuickSet.uue | 784537 | 03/01/2001 |
| rasa_simple.uue | 26288 | 03/01/2001 |
| Speech.uue | 191979 | 03/01/2001 |
| startup.uue | 500 | 03/05/2001 |
| TermEx.uue | 39179 | 03/01/2001 |
| tts.uue | 90322 | 03/05/2001 |

Appendix B is a copy of forty two page co-pending application No. 60/188,524 filed Mar. 10, 2000.

Appendix C is a copy of twelve page co-pending application No. 60/188,553 filed Mar. 10, 2000.

Appendix D is a copy of a seven page document entitled "Unification-based Multi-modal Parsing" by Michael Johnson Appendix E is a copy of a seven page document entitled "Creating Tangible Interfaces by Augmenting Physical Objects with multi-modal Language" by David McGee and Philip Cohen.

Appendix F is a copy of a nine page document entitled "Something from Nothing: Augmenting a paper-based work practice via multimodal interaction" by David R. McGee, Philip R. Cohen and Lizhong Wu.

All of the above listed appendices A to F are hereby incorporated herein in their entirety by reference.

FIELD OF THE INVENTION

The present invention relates to computer systems and more particularly to a method and system which provides for interaction between a user and a computer system.

BACKGROUND OF THE INVENTION

The prior art provides a number of methods for computationally augmenting natural, non-digital settings. The term augmenting is herein used to mean extending a physical artifact so that it represents or denotes something more or something new, and thereby gains computation meaning and behavior.

A paper, by Underkoffler, J. and Ishii, H., Urp: "A luminous-tangible Workbench for Urban Planning and Design", published in the *Proceedings of the ACM Conference on Human Factors in Computing Systems* (CHI '99), May 1999, ACM Press, 386–393 describes a system called "Urp" that planners use to build models, rulers, clocks, and other physical objects. Objects are tagged by patterns of colored dots, and if a pattern is recognized, a vision system sends Urp the associated object's location. With Urp, augmented objects "behave" as you would expect them to: rulers measure distances, clocks mark time, and so on. The object's physical characteristics and the environment it inhabits govern these expectations A paper by Wellner, P.,"Interacting with paper on the DigitalDesk" published in the Communications of the ACM, 1993. 36(7): 87–96 describes a system that augments office work by introducing paper into a workstation environment. Through computer vision, users can point at numbers on a real piece of paper, in response to which the system performs optical character recognition and pastes the recognized number into the system's calculator. Similarly, regions of real paper, like a sketch on a napkin, can be cut and pasted into a painting program.

A paper by Ishii, H. and Ullmer, B., "Tangible bits: towards seamless interfaces between people, bits and atoms", published in the *Proceedings of the ACM Conference on Human Factors in Computing Systems* (CHI '97), March 1997, ACM Press, 234–241 describes a system with a shared whiteboard, uses barcode-tagged cards to hold digital ink. However, the ink can only be retrieved when scanned by a barcode reader connected to a desktop computer.

A paper by Coen, M. H., "Design principles for intelligent environments" published in the *Proceedings of the Conference on Artificial Intelligence* (AAAI '98), July 1998, American Association for Artificial Intelligence, 547–554 describes a system that uses Post-it Notes to activate behaviors in the room. Different colored Post-it Notes are used so that they can be easily distinguished from each other and from the supporting table by a vision system. Ink on each note is used only to remind the user of the action to expect, not as input to the system.

A system call "Passage " is described in a paper by Streitz, N. A., Geibler, J., and Holmer, T., "Roomware for cooperative buildings: integrated design of architectural spaces and information spaces" published in the *Proceedings of the First International Workshop on Cooperative Buildings: Integrating Information, Organization, and Architecture* (CoBuild '98), February 1998, Springer-Verlag, 4–21 and a technique termed RFID (radio frequency identifier) is described in a paper by Want, R., Fishkin, K. P., Gujar, A., and Harrison, B. L., Bridging physical and virtual worlds with electronic tags, in the *Proceedings of the ACM Conference on Human Factors in Computing Systems* (CHI '99), May 1999, ACM Press, 370–377. These systems interpret the human act of augmenting paper in order to create a digital representation and provide some flexibility in changing that data. Within the Passage concept, meaning can be linked graphically to a physical object whenever that object is placed on a "bridge." In the initial prototype, the bridge is a scale and recognizes objects based on their weight. With the RFID system, tags are hidden in books, documents, watches, etc. As with Passage, associational augmentations can be formed when the tags are first detected. These systems do not yet support a pre-existing work practice, nor can users learn what information is associated with an object unless the users and the object are adjacent to a bridge or detector. More generally, associational augmentation methods like these and others, such as the use of colored dots, glyphs, or bar codes, fail to present the linked digital information to the user without the assistance of technology.

A paper by Moran, T. P., Saund, E., Melle, W. V., Bryll, R., Gujar, A. U., Fishkin, K. P., and Harrison, B. L., "The ins and outs of collaborative walls: Demonstrating the Collaborage concept", published in the *Proceedings of the ACM Conference on Human Factors in Computing Systems* (CHI '99), May 15–20, 1999, ACM Press, CHI'99 Extended Abstracts, 192–193T herein called the Collaborage concept. The Collaborage concept characterizes augmented systems consisting of a board and various tagged physical information items. Several such prototypes have been built. One of these prototypes is an In/Out board system with glyph-tagged magnetized photos that can be slid from the Out column to the In column and vice-versa. Within seconds, a vision system recognizes the change in location of the glyph and an In/Out web page is updated to reflect the change in status. If the system were to fail, individuals could still check the physical In/Out board, move their picture from one column to the other, add hand-written annotations, and walk away with up-to-date information. Because objects are augmented using glyphs rather than a natural language, users cannot easily add new digital information to the board. For example, a new employee cannot use any magnet and photograph and expect it to work in the Collaborage system.

SUMMARY OF THE PRESENT INVENTION

The present invention provides a method and system designed to augment, rather than replace, the work habits of its users. These work habits include practices such as drawing on secondary physical documents (e.g. Post-it™ notes) using a symbolic language and placing these secondary physical documents on a primary physical document such as a map. With the present invention the system observes and understands the language used on the primary and secondary physical documents and the system assigns meaning simultaneously to objects in both the physical and virtual worlds. Since the data is preserved in physical form, the physical documents serve as a back-up in the case of electronic system failure. With the present invention users can utilize a paper primary physical document such as a map, register it, and augment the primary physical document by placing secondary physical documents on the primary physical document. The secondary physical documents can be moved from one place to another on the primary document. Once an object is augmented, users can modify the meaning represented by it, ask questions about that representation, view it in virtual reality, or give directions to it, all with speech and gestures.

DETAILED DESCRIPTION

Figure 1:
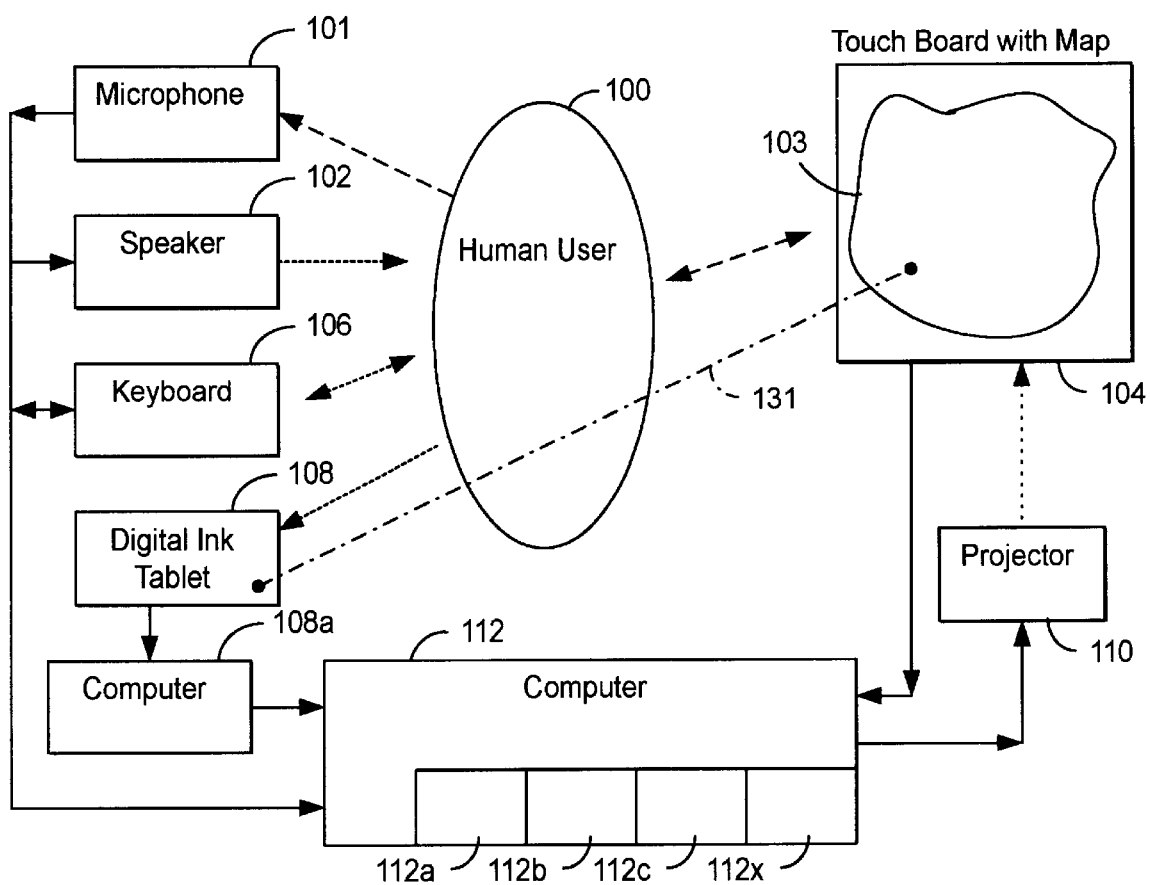
FIG. 1 is an overall diagram of the system.

FIG. 1 is an overall diagram of a first embodiment of the present invention. The system combines the advantages of a paper system and the advantages of an electronic computer system. These advantages are achieved without adding substantially to the task. The user continues to employ familiar tools and procedures. The physical artifacts normally employed by the user become a computational interface.

The human operator 100 and various input and output components of the system are positioned near a large touch board 104. A primary physical document, that is, a map 103 is positioned on the touch board 104. The human operator 100 communicates with the system via a number of input-output devices that are connected to a computer 112.

The input-output devices that are connected to computer 112 include a microphone 101, a speaker 102, a keyboard 106, a digital ink tablet 108, and a projector 110. The touch board 104 also provides input to computer. The digital ink tablet 108 is operated by a computer 108A which communicates with computer 112. The digital ink tablet 108 may be the commercially available tablet marketed under the trademark "Crosspad Ipenpro" marketed by Cross Computing Inc. The touch board 104 may be the commercially available touch board marketed under the trademark "SMART Board".

The system provides the human operator 100 with multi-modal interaction with the computer system. The human operator 100 can issue instructions and provide information via microphone 101 and keyboard 106. The operator can receive information via the audio speaker 102. A projector 110 projects images on the map 103 that are visible to the operator. As will be explained in detail later, the digital ink tablet 108 and the touch board 104 also serve as devices through which the operator communicates with the computer system. The line 131 in FIG. 1 indicates that the operator writes on Post-it notes and physically places them on touch board 104. The map 103 is hereinafter referred to as the primary physical document. The Post-it notes are hereinafter referred to as the secondary physical document. The computer 112 includes a number of computer programs designated 112a, 112b, 112c, and 112x. The functions which are performed by these computers programs are hereinafter described.

The first preferred embodiment of the invention is directed to a system which could for example be used in a military command post. The central feature in a typical military command post is a map. Typically when unit positions are reported over the radio, an officer draws a symbol depicting the unit's strength, composition, and other relevant features on an adhesive note such as the widely used "Post™" notes. The Post-it note is next placed at the appropriate location on the map. It is the job of users in each command post to keep all of the information on the map as accurate and as complete as possible, so that their superiors can make critical decisions efficiently and quickly.

Typically units are identified on the Post-it notes and on the map by special unit symbols. There is a standard format for the pictograms that comprise the unit symbols. The unit symbols are part of a composable language that is used by many military organizations. The location of the Post-it notes on the map represent a unit's position in the real world Often there are from several dozen to several hundred Post-it notes arrayed on a typical command post map. In addition to the information represented by the Post-it notes on the map, auxiliary information is often available on nearby charts. In a typical command post, anyone can observe the map and thereby have a clear picture of the current state of affairs.

The present invention augments the functions performed in a typical command post without requiring the operator to drastically change the normal mode of operating the command post. The system captures the relevant information in electronic form so that it can be preserved, electronically analyzed and transmitted to remote locations. Furthermore, the relevant information is preserved in hard copy form so that in the event of electronic failure, the command post can continue to function.

Figure 2:
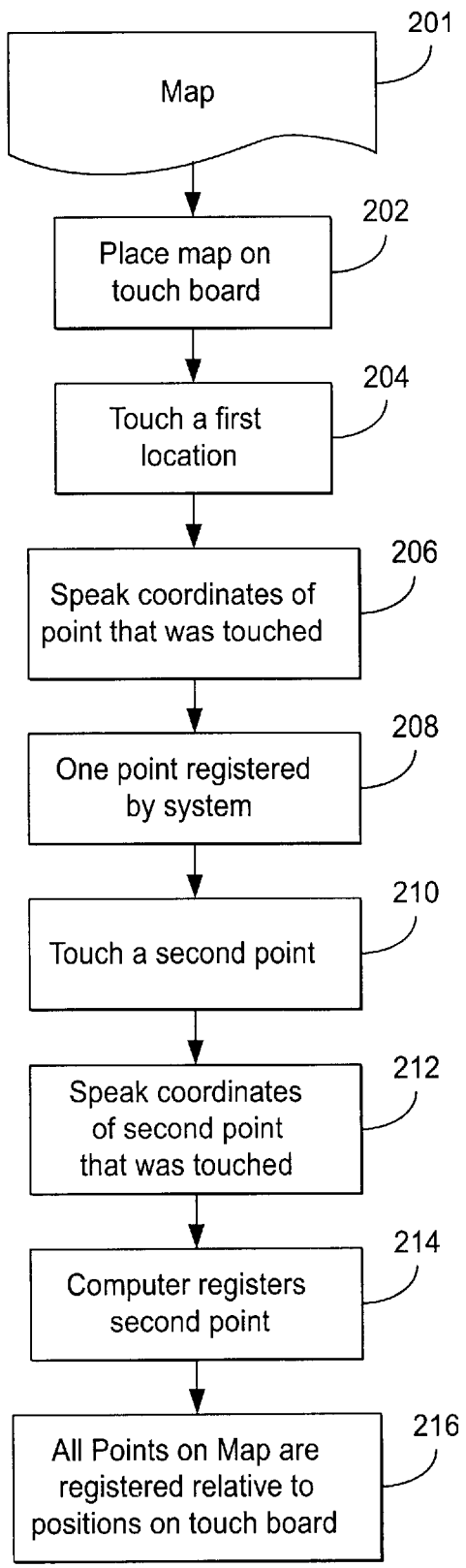
FIG. 2 is a block flow diagram showing how a document is registered.

The first step which must be performed with the present invention is to orient map 102 relative to touch board 104. The orientation process is shown in block diagram form in FIG. 2. As indicated by blocks 201 and 202, the map is placed on the touch board 104. Next the operator touches a location on the map, and speaks the coordinates of the position that was touched. As indicated by block 208, the touch board 104 indicated to the system the position that was touched and the system registers that location on the board as having the coordinates that were spoken. The process is then repeated for a second point on the map as indicated by blocks 210 to 214. Once the coordinates of two positions have been registered the system can correlate any other positions on touch board 104 with any coordinates on map 103.

Figure 3:
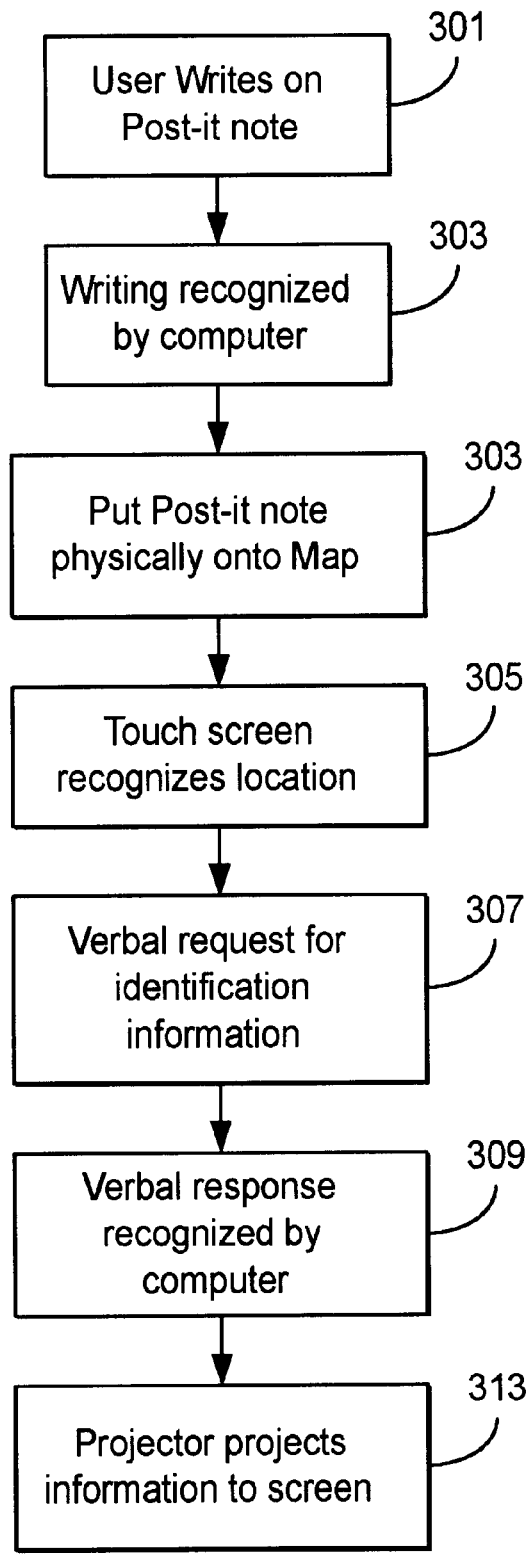
FIG. 3 is an example of the steps performed by the system.

FIG. 3 illustrates a simple but illustrative set of steps performed by the system. As indicated by block 301, the process illustrated in FIG. 3 begins when the operator writes or draws on a post-it note. The writing takes place while the post-it note is on digital ink tablet 108, thus the writing is electronically captured and recognized. Next the operator physically moves the post it note and places it on touch board 104 (represented by line 131 in FIG. 1). The touch screen 104 detects when the operator presses the post-it note onto the board 104. As indicated by block 307, the system would then verbally request that the operator provide certain information about the unit represented by the post-it note that was placed on the map. The operator speaks the requested information and it is recognized by the system as indicated by block 309. The system then creates an electronic image of the information and projects it onto board 104 via projector 110.

At this point in the process, there is a posit-it note on board 104 which indicates certain information. This information is stored in computer 112 and the stored information is displayed on board 104 at the same location as the post-it note so that the electronic information can be verified.

Figure 4:
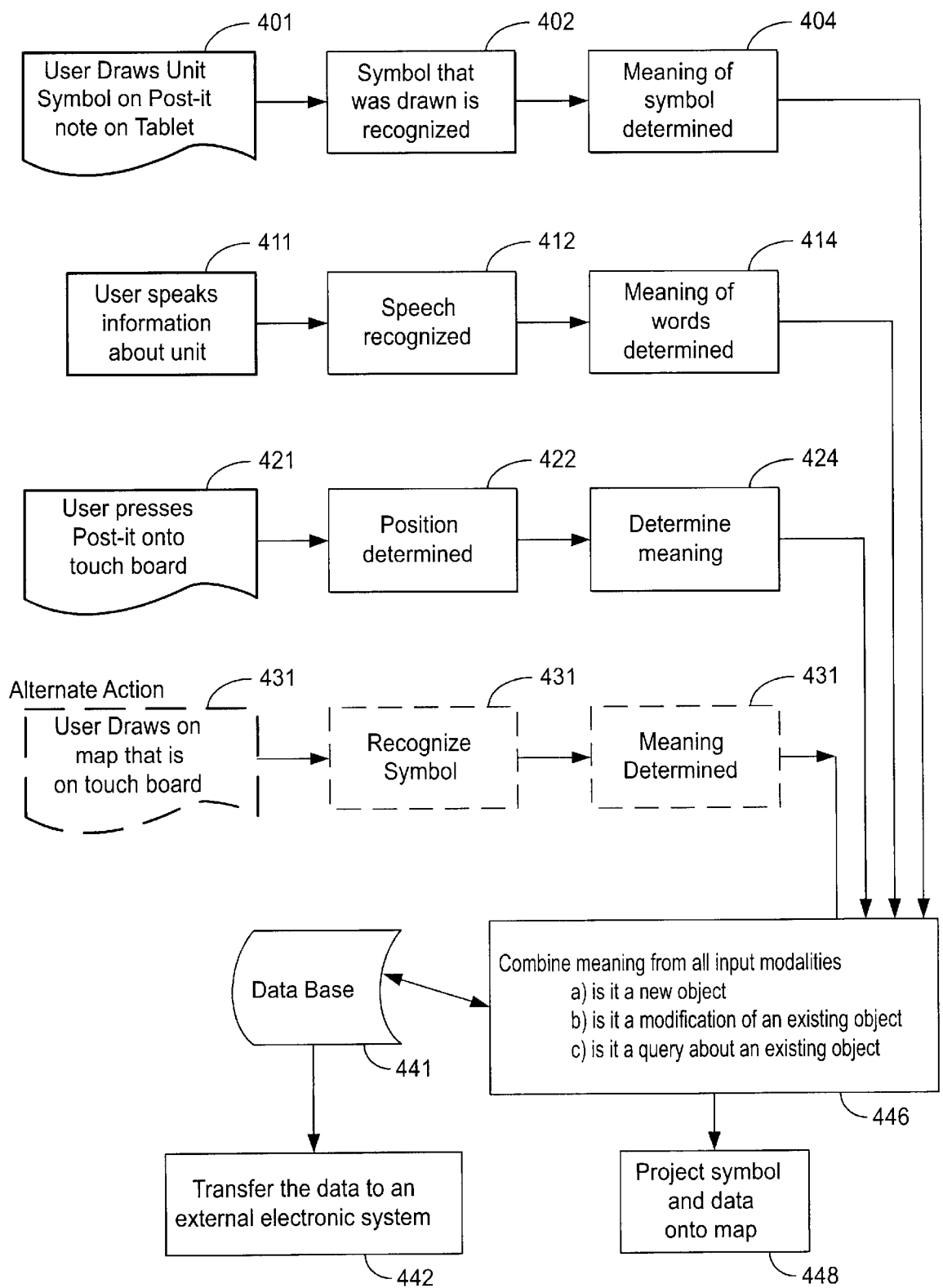
FIG. 4 is a more detailed flow diagram of the operations performed by the system.

FIG. 4 is a more detailed program flow diagram showing the operations performed. Blocks 401, 411, 421 and 431 illustrate the operator providing input to the system. The user can also type information into keyboard 106. Block 448 indicates that the system provides output by projecting images onto board 104 via projector 110. Block 442 indicates that the information acquired by the system can be transferred to another remotely located command post. The dark lines on blocks 401, 421 and 431 indicate that these are physical documents that retain information in the event of electronic system failure. The electronic information or data is stored in a data base 441.

As an example of the operations performed by the system, block 401 indicates that the operator draws a symbol on a Post-it note. The drawing is done with the Post-it note on digital ink tablet 108 which electronically captures the material that is written. The symbol is recognized using the approach described in patent application No. 60/188,524 which is entitled "A robust Approach to Gestural and Multi-modal Recognition" which is hereby incorporated by reference.

Next, as indicated by block 404, the meaning of the symbol is determined. For example, the user might draw a symbol for a "Recon Company". This is a standard symbol which the system would recognize. This system has the attributes of name, size, etc. The system would ask the operator to input these via the microphone. As indicated by blocks 412 and 414, the words are recognized. Recognition can be done by commercially available programs such as the "IBM VoiceType Application Factory" or by "Dragon Systems Naturally Speaking".

As indicated by block 446, the inputs from all the modalities are combined to determine if the input represents a new object, or a modification of an existing object. The input can also merely be a query about an existing object.

Figure 5:
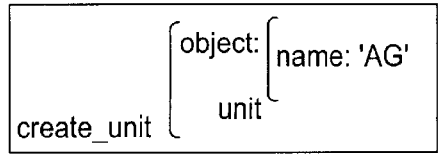
FIGS. 5, 6 and 7 show how data feature structure and multi-modal grammar rules.
Figure 6:
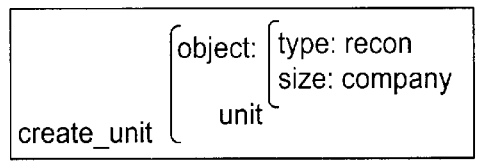
Figure 7:
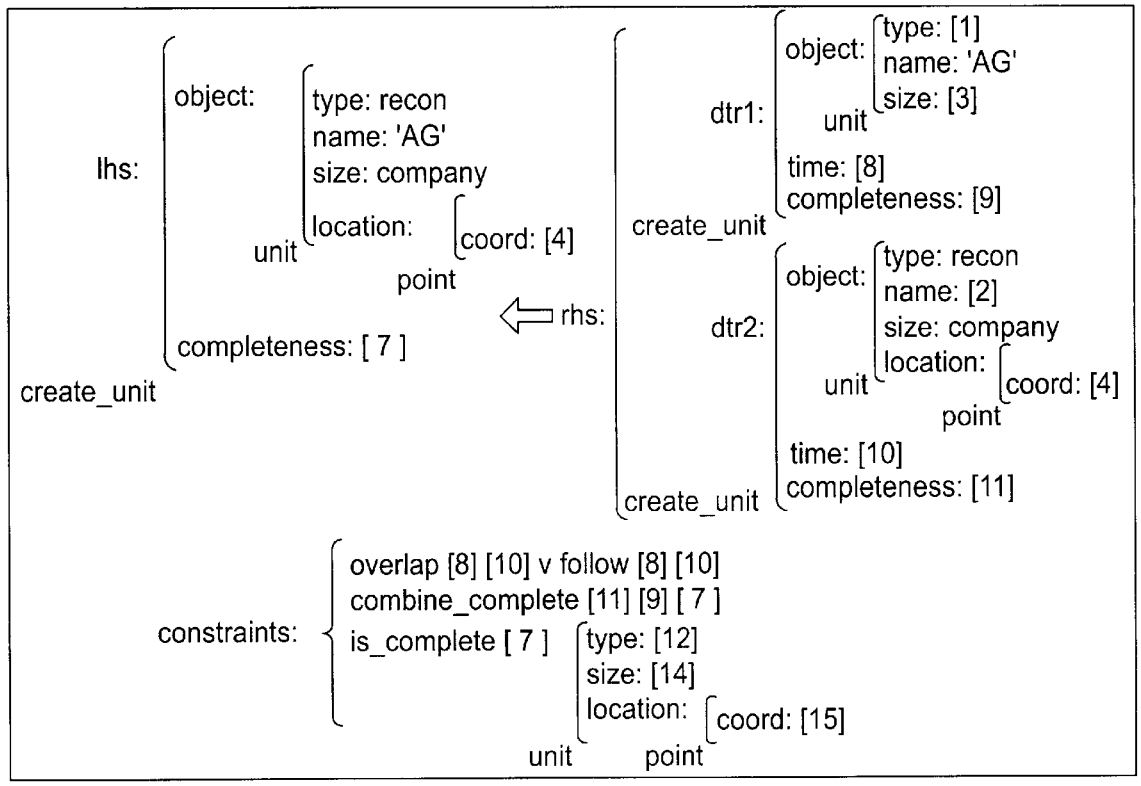

The data structure is shown in FIGS. 5, 6 and 7. This data structure is described in the attached document entitled "Creating Tangible Interfaces by Augmenting Physical Objects with Multi-modal Language".

Figure 8:
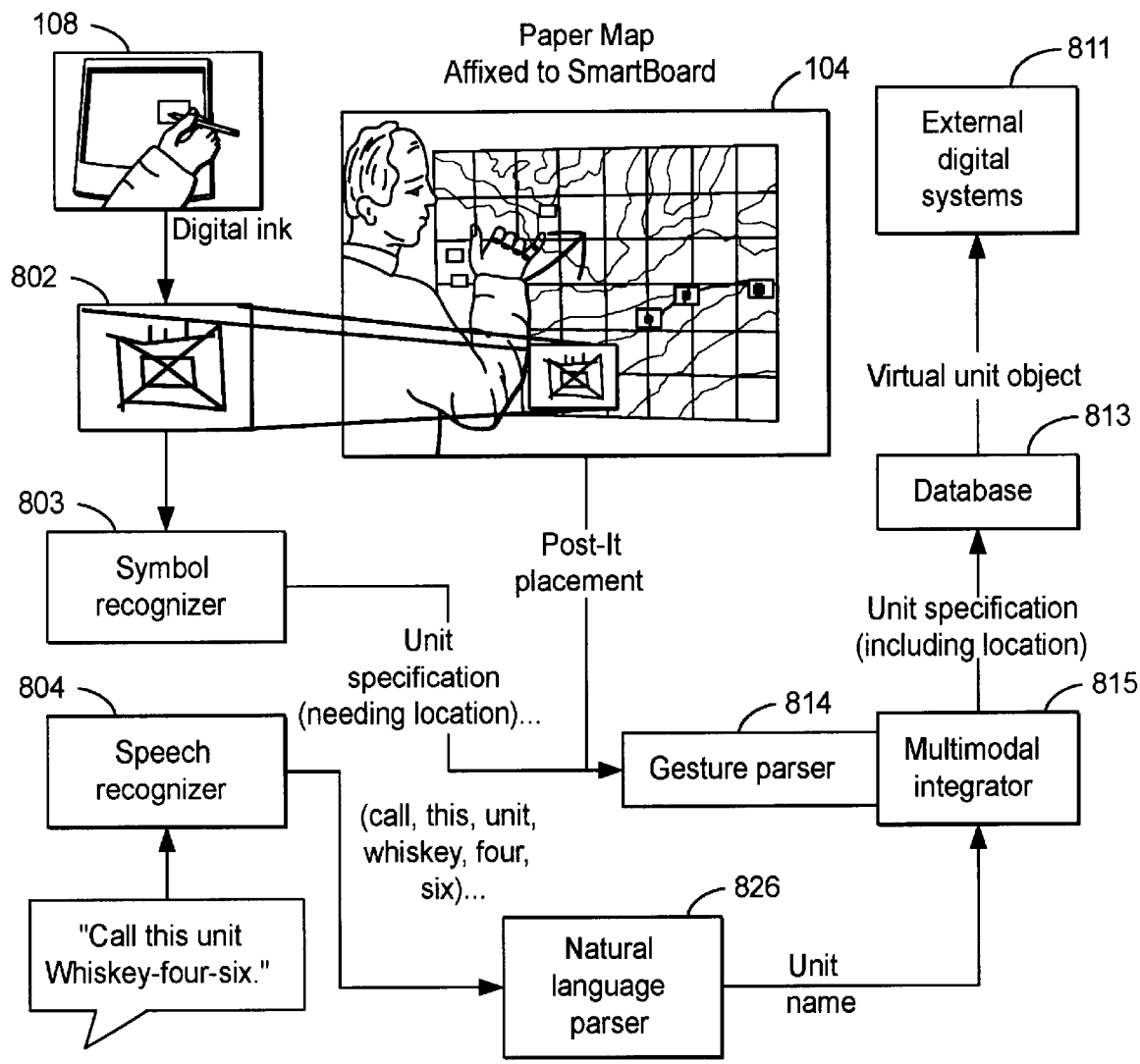
FIG. 8 is a program flow diagram.

FIG. 8 is a program flow diagram of the programs in computer 112 which implement this invention. A copy of the program is provided on a compact Disk which is appended hereto as Appendix A. FIG. 8 also shows some of the physical units. The touch board 104 which includes the map 103 is shown in FIG. 8 in more detail that in FIG. 1. As indicated by block 802, symbols are drawn on Post-it notes which are on digital ink tablet 108. A symbol recognizer program 803 recognizes this symbol. The technology used by the symbol recognizer 803 is given in Appendix B.

Information spoken into microphone 101 is recognized by speech recognizer program 804 (this program performs step 412 shown in FIG. 4). Such programs are commercially available from companies including IBM and Dragon Systems Inc. The spoken information is parsed into grammar as shown in FIGS. 5, 6, and 7 by Natural Language parser 826 (this is step 414 in FIG. 4). Gestures are parsed by Gesture parsing program 814 (this is what performs 404 and 424 in FIG. 4). The input information from the various input modalities is integrated by program 815 (this performs step 446 in FIG. 4). Information about the objects is stored in data base 813 and provides data to external systems 811 as desired (see steps 441 and 442 in FIG. 4).

The steps implemented by Multimodal integrator 815 are described in The attached paper entitled "Unification-based Multimodal Parsing". (see also co-pending application No. 60/188,524 which is appended).

A program used to implement the preferred embodiment of the present invention is attached as an appendix on a CD. The attached CD includes the following files (all of which are incorporated herein by reference).

aaaAgents.uue—ASCII form of aaaAgents.jar: Java byte code for the AAA facilitator agent which enables the agents to communicate.

aaaLib.uue—ASCII form of aaaLib.jar: Java byte code for the agent communication part of the AAA facilitator and GateKeeper.

blank_bmp.uue—ASCII form of blank.bmp: A dummy blank map picture used by QuickSet as a map backdrop.

blank_map.uue—ASCII form of blank.map: A short text file describing a blank map for QuickSet.

bridge.uue—ASCII form of bridge.exe: A Prolog agent in x86 executable form which receives commands in Prolog feature-structure form and interprets them to transmit the commands further in Prolog standard functor form.

coord_rdr.uue—ASCII form of COORD.RDR: A text file from the US Government which describes the transformation of Universal Transverse Mercator map coordinates as used by the military into latitude-longitude coordinates.

EggTimer.uue—ASCII form of EggTimer.exe: A simple agent (x86 executable) which helps control timing for the multiparse agent.

GateKeeper.uue—ASCII form of GateKeeper.jar: Java byte code for the GateKeeper agent which acts as a storehouse for entities which may appear on the map, representing units, lines, points and such, and also executes commands related to such entities.

Gesture.uue—ASCII form of Gesture.exe: An agent (x86 executable) which receives messages consisting of a set of points representing a gesture on a map, and issues messages which represent the possible interpretations of these points as gestures.

mm_ogi_nl.uue—ASCII form of mm_ogi_nl.exe: A Prolog agent in x86 executable form which receives messages consisting of text interpretations of speech, and issues messages in Prolog feature-structure form for possible commands resulting from this speech text.

multiparse.uue—ASCII for multiparse.exe: A Prolog agent in x86 executable form which receives messages consisting of possible commands from of speech and also messages consisting of gestures, interprets the gestures as possible commands, and combines the possible speech and gesture commands according to certain rules into a combined unimodal or multimodal command made up of one or more feature structures.

QuickSet.uue—ASCII form of QuickSet.exe: An agent (x86 executable) which displays a map, the objects on the map, and allows the user to enter commands with speech and gesture.

rasa_simple.uue—ASCII form of rasa_simple.grm: A grammar file compatible with Microsoft Speech API 4.0 (SAPI 4), which instructs a SAPI-compliant speech recognition engine on how to interpret an audio stream as a series of words which represent commands compatible with the system of agents.

Speech.uue—ASCII form of Speech.exe: An agent (x86 executable) which employs a SAPI-4 or IBM Voice-Type speech recognition engine to interpret the user's spoken input as text for possible commands.

startup.uue—ASCII form of startup.bat: A DOS-type batch file (text) as an example of how the agents may be started so as to work together.

TermEx.uue—ASCII form of TermEx.jar: Java byte code supporting the GateKeeper, helping it to store objects and execute operations on them, by assisting in the conversion of objects from Prolog agent messages to native Java format.

tts.uue—ASCII form of TTS.exe: An agent (x86 executable) which receives text messages and employs SAPI text-to-speech to produce audible speech audio output so as to as help inform the user of certain events.

Various alternative embodiments of the invention are also possible without departing from the spirit and scope of the invention. The present invention can be used with other types of technologies. For example the invention can be used with the technologies shown in U.S. Pat. No. 5,862,271 (the contents of which are incorporated herein by reference) and on the web site: http://www.anoto.com/. The referenced web site describes a special type of pre-printed paper as follows:

"On this paper is printed the Anoto™ pattern, consisting of very small dots slightly displaced from a grid structure. A minute section of the pattern will give you your exact location on the full pattern. As you write or draw on the paper with your Anoto pen, the pen creates a digital trace of whatever you do. This information is stored in the pen until you tick the appropriate checkbox. The information is then forwarded from your Anoto pen directly to your nearby personal computer, or by a Bluetooth™ device—such as a Bluetooth enabled mobile phone—to any computer, mobile phone or information bank in the world via the Internet.

Anoto functionality allows you to send whatever you write or draw directly to your nearby personal computer, or via the Internet to any computer, mobile phone or information bank in the world."

In one alternative embodiment of the present invention the above described paper is used instead of the touch board 104 and/or the digital ink tablet 108. In such an embodiment, the information written on the paper and/or the Post-it note is automatically captured. Hence a physical and machine record are simultaneously produced.

In the military command post environment described above, the tactical situation as recorded on the paper can be automatically captured, analyzed and electronically relayed to other command centers. In the event of a power failure, the physical paper forms an appropriate back up record. In the first embodiment described herein the primary physical document is map 103 and the secondary physical documents are Post-it notes. It should be understood that various and sundry other types of primary physical documents may be employed with the invention. Likewise a wide variety of types of secondary physical documents could be used. The secondary physical documents could for example be written material on the heads of push pins.

In yet other alternate embodiments, one or more machine vision systems is used in place of one or both the touch board 104 and the ink tablet 108. For example, in one alternate embodiment, the primary physical document (e.g. map 103) is placed on a non-electronic board. When the secondary documents are placed on the non-electronic board, a machine vision system is used to detect the location where the secondary documents are placed and to detect any drawings that are made on the primary physical document. The same (or a different) machine vision system can be used to determine what is written on the secondary physical documents in place of ink tablet 108. Thus, either one or both the touch board 104 and/or the ink table 108 can be replaced by a machine vision system.

While the invention has been described with respect to various embodiments thereof, it should be appreciated that various changes in form and detail can be made without departing from the spirit and scope of the present invention.

What is claimed is:

1. A system for augmenting a paper-based work practice such that a combination physical record formed from a combination of a primary physical document and one or more secondary physical documents is retained to provide a backup and an electronic duplicate of some or all of the combination physical record is prepared and made accessible for analysis and communication, said augmenting system comprising:

a touch board sized and shaped to accommodate the primary physical document positioned thereon so that the primary physical document has positions relative to said touch board;

a keyboard;

a microphone;

a computer system to which said touch board and said microphone are cooperatively connected such that, after a human operator touches a first location on the primary physical document and generally contemporaneously speaks into said microphone first location coordinates of the first location that is touched on the primary physical document, and after the human operator touches at least a second location on the primary physical document and generally contemporaneously speaks into said microphone second location coordinates of the second location that is touched on the primary physical document, said computer system, to which touch location information electronically produced by touching and spoken coordinate information produced by speaking the first location coordinates and the second location coordinates into said microphone are communicated, can correlate any other locations on the primary physical document with the positions on said touch board;

a digital ink tablet connected to and operated by a digital ink tablet computer cooperatively connected to said computer system, said digital ink tablet sized and shaped to accommodate the one or more secondary physical documents thereon such that when at least one of the one or more secondary physical documents is written or drawn on, secondary physical document writing is produced which is electronically captured and recognized by and communicated from said digital ink tablet computer to said computer system;

a speaker cooperatively connected to said computer system such that, when the secondary physical document containing the secondary physical document writing is moved from said digital ink tablet and placed on the primary physical document positioned on said touch board, the location at which the secondary physical document is placed relative to the primary physical document is electronically recognized by said computer system and said speaker broadcasts a request the human operator to orally communicate information that identifies relative significance of the secondary physical document writing, said orally communicated identifying information is received by said microphone and transmitted to said computer system at which the orally communicated identifying information is recognized by and analyzed for meaning and an electronic projection image is formed for projecting;

said microphone cooperatively connected to said computer system such that oral inputs can be communicated by the human operator to said computer system;

a projector cooperatively connected to said computer system such that the electronic projection image is received from said computer system and projected onto said touch board so that the electronic projection image may provide other information or is comparable to the secondary physical document writing; and a database cooperatively connected to said computer system for receipt and storage of and so that the touch location information, the spoken coordinate information, the secondary physical document writing, the orally communicated identifying information, the oral inputs, and the electronic projection image is accessible and transferrable through a transfer system to one or more systems remote from said touch board that includes the primary physical document on which one or more secondary physical documents are positioned and that thereby form the combination physical record that provides the backup.

2. The augmenting system according to claim 1 wherein the primary physical document is generally planar in form.

3. The augmenting system according to claim 1 wherein the secondary physical document is sized and shaped and of a structure and composition so that secondary physical document may be affixed to or through a surface of the primary physical document.

4. The augmenting system according to claim 1 wherein the primary physical document is composed of or includes paper or a paper-like material.

5. The augmenting system according to claim 1 wherein the secondary physical document is composed of or includes paper or a paper-like material.

6. A system for augmenting a paper-based work practice such that a combination physical record formed from a combination of a primary physical document and one or more secondary physical documents is retained in original form to provide a backup and an integrated electronic version, that includes electronic inputs including by electronic capturing some or all of the combination physical record, is prepared and made accessible for analysis and communication, said augmenting system comprising:

a touch board sized and shaped to accommodate the primary physical document positioned thereon so that the primary physical document has positions relative to said touch board;

a keyboard;

a microphone;

a computer system to which said touch board and said microphone are cooperatively connected such that, after a human operator touches a first location on the primary physical document and generally contemporaneously speaks into said microphone first location coordinates of the first location that is touched on the primary physical document, and after the human operator touches at least a second location on the primary physical document and generally contemporaneously speaks into said microphone second location coordinates of the second location that is touched on the primary physical document, said computer system, to which touch location information electronically produced by touching and spoken coordinate information produced by speaking the first location coordinates and the second location coordinates into said microphone are communicated, electronically captures the touch location information and the spoken coordinate information and correlates any other locations on the primary physical document with the positions on said touch board;

a digital ink tablet cooperatively connected to said computer system, said digital ink tablet sized and shaped to accommodate the one or more secondary physical documents thereon such that when at least one of the one or more secondary physical documents is written or drawn on, secondary physical document writing is produced which is electronically captured and recognized by and communicated to said computer system;

a speaker cooperatively connected to said computer system such that, when the one of the one or more secondary physical documents containing the secondary physical document writing is moved from said digital ink tablet and placed on the primary physical document positioned on said touch board, the location at which the one of the one or more of the secondary physical documents is placed on the primary physical document is electronically recognized by said computer system and said speaker broadcasts a request to which the human operator may communicate to said computer system information that identifies relative significance of the secondary physical document writing;

said speaker, said microphone, and said computer system further cooperatively connected such that the human operator may communicate to said computer system, such as through said microphone, commands or inquiries which said computer system recognizes and analyzes and to which said computer system formulates and provides an output such as responses communicated audibly through said speaker;

said computer system electronically combining the electronic inputs to said computer system, including the touch location information, the spoken coordinate information, the secondary physical document writing, significance identifying information, orally communicated information, and other multi-modal communications to form the integrated electronic version and from which an electronic display image is formed for displaying;

a display cooperatively connected to said computer system such that the electronic display image is received from said computer system and displayed including for verification of some or all of the integrated electronic version; and a database cooperatively connected to said computer system for receipt and storage of the electronic inputs and the integrated electronic version that are transferable through a transfer system to one or more systems remote from said touch board that includes the primary physical document on which the one or more secondary physical documents are positioned and that thereby form the combination physical record that provides the backup.

7. A method for augmenting a paper-based work practice such that a combination physical record formed from a combination of a primary physical document on which one or more secondary physical documents are positioned is retained in hard copy form to provide a backup and an electronic duplicate of some or all of the combination physical record is prepared and made accessible for analysis and communication, said augmenting method comprising:

orienting the primary physical document relative to a touch board cooperatively connected to a computer system, said orienting step comprising the steps of:
placing the primary physical document on the touch board such that locations on the primary physical document are relative to positions on the touch board;
touching a first location on the primary physical document to produce first touch location information and generally contemporaneously speaking into a microphone cooperatively connected to the computer system first location coordinates of the first location on the primary physical document that is touched to produce spoken first location coordinate information;
touching at least a second location on the primary physical document to produce second touch location information and generally contemporaneously speaking into the microphone second location coordinates of the second location on the primary physical document that is touched to produce spoken second location coordinate information; and
analyzing the first touch location information and the spoken first location coordinate information and the second touch location information and the spoken second location coordinate information by the computer system such that generally all other locations on the primary physical document are correlated with the positions on the touch board;

positioning the secondary physical document on a digital ink tablet sized and shaped to accommodate and to permit writing or drawings made relative to the secondary physical document such that secondary physical document writing is produced which is electronically captured and recognized and communicated from the digital ink tablet computer to the computer system;

writing or drawing relative to the secondary physical document to produce the secondary physical document writing;

orally communicating oral inputs to the computer system;

removing the secondary physical document from the digital ink tablet;

placing the secondary physical document on the primary physical document;

responding to a request from the computer system to identify relative significance of the secondary physical document writing such that the response is transmitted to the computer system;

analyzing the secondary physical document writing, the placing of the secondary physical document on the primary physical document, and the oral inputs for meaning and forming an integrated version and an electronic projection image for projecting;

projecting the electronic projection image so that the electronic projection image is comparable to the secondary physical document writing; and storing at least the integrated version and information at least with respect to the secondary physical document in a database cooperatively connected to the computer system for receipt and storage of and so that the information is accessible and transferrable through a transfer system to one or more systems remote from the touch board on which the primary physical document and one or more of the secondary physical documents are positioned and that thereby form the combination physical record that provides the backup.

8. The augmenting method according to claim 7 wherein the request from the computer system is audibly communicated through a speaker system.

9. The augmenting method according to claim 7 wherein the responding step is performed by orally speaking into the microphone.

10. The augmenting method according to claim 7 further comprising a step of verifying the electronic display image with the secondary physical document writing.

11. The augmenting method according to claim 7 further comprising a step of inputting additional information through a peripheral apparatus to the computer system.

12. A method for recording and displaying information such that a combination physical record formed from a combination of a primary physical document and one or more secondary physical documents is retained in hard copy form to provide a backup and at least an electronic duplicate of some or all of the combination physical record is prepared and made accessible for analysis and communication, said recording and displaying method comprising:

positioning the primary physical document such that a machine vision system cooperatively connected to a computer system may be used to detect one or more writings or drawings made relative to the primary physical document;

writing or drawing on the primary physical document to form primary physical document writing;

additional writing or drawing on one or more secondary physical document to produce secondary physical document writing that may be electronically captured and recognized through use of the computer system;

identifying through oral inputs to the computer system relative significance to form an electronic duplicate generally contemporaneously with said writing or drawing or said additional writing or drawing;

electronically capturing and recognizing through the use of the computer system the primary physical document writing and the secondary physical document writing to form the electronic duplicate;

placing the one or more secondary physical documents on the primary physical document such that the machine vision system cooperatively connected to the computer system may be used to detect identity or location of the one or more secondary physical documents;

evaluating all or a portion of the primary physical document writing and the identity or location of the one or more secondary physical documents through use of the machine vision system;

providing a response to a request from the computer system to identify additional relative significance of the secondary physical document writing such that the response is transmitted to the computer system;

analyzing the oral inputs, the response, and other multimodal communications for meaning;

forming an electronic display image for displaying;

displaying the electronic display image so that the electronic display image is comparable to the secondary physical document writing; and storing information at least with respect to the one or more secondary physical documents in a database cooperatively connected to the computer system for receipt and storage of and so that the information is accessible and transferrable as the electronic duplicate through a transfer system to one or more systems remote from the primary physical document and the one or more of the secondary physical documents and that thereby form the combination physical record that provides the backup.

13. The recording and displaying method according to claim 12 wherein the positioning of the primary physical document occurs on a non-electronic board.

14. The recording and displaying method according to claim 12 wherein a digital ink tablet is used to assist performance of said electronically capturing and recognizing step.

15. The recording and displaying method according to claim 12 wherein the machine vision system or an additional machine vision system is used to identify the secondary physical document writing on the one or more secondary physical documents.

16. A method for extending a paper-based work practice such that a primary physical document is retained in hard copy form to provide a backup and an electronic duplicate is prepared and made accessible for analysis and communication, said recording and displaying method comprising:

positioning the primary physical document such that a machine vision system cooperatively connected to a computer system may be used to detect one or more writings or drawings made relative to a surface of the primary physical document;

writing or drawing relative to the primary physical document to produce primary physical document writing that may be electronically detected, captured, and recognized through use of the machine vision system;

identifying through oral inputs to the computer system relative significance of the primary physical document writing generally contemporaneously with said writing or drawing on the primary physical document;

electronically detecting and capturing through the use of the machine vision system and recognizing through the use of the computer system the primary physical document writing on the primary physical document;

detecting location of any one or all of the primary physical document writings that may be made on the surface of the primary physical document through use of the machine vision system;

providing a response to a request from the computer system to identify additional relative significance of the primary physical document writing such that the response is transmitted to the computer system;

analyzing the response for meaning;

facilitating formation of an electronic display image for displaying;

displaying the electronic display image so that the electronic display image is comparable to the primary physical document writing; and storing information received by the computer system in a database so that the information is accessible and transferable as the electronic duplicate through a transfer system to one or more systems remote from the primary physical document provided as the backup to the paper-based work practice.

17. A method for electronically extending a paper-based work practice such that a physical document that may be formed from a combination of one or more other documents is retained in hard copy form to provide a backup and an integrated electronic version, that includes electronic inputs including an electronic capture of some or all of the physical document is prepared and made accessible for analysis and communication, said electronically extending method comprising:

positioning the primary physical document such that a machine vision system cooperatively connected to a computer system may be used to electronically capture one or more writings or drawings made relative to the primary physical document;

writing or drawing relative to the primary physical document to produce primary physical document writing that may be electronically captured through use of the machine vision system;

electronically capturing to the computer system through the use of the machine vision system the primary physical document writing;

identifying through oral inputs to the computer system relative significance of the primary physical document writing, the oral inputs provided generally contemporaneously with said writing or drawing on the primary physical document;

detecting at least location of any one or all of the primary physical document writings that may be made on the surface of the primary physical document through use of the machine vision system;

providing a response to a request from the computer system to identify additional relative significance of the primary physical document writing such that the response is transmitted to the computer system;

interacting through added oral inputs to the computer system including in answer to audible queries from the computer system;

analyzing and electronically combining the electronically captured primary physical document writing, the oral inputs, the detected locations, the significance response, the added oral inputs, and other multi-modal communications that form some or all of the electronic inputs to provide the integrated electronic version from which an electronic display image may be produced;

displaying the electronic display image so that the electronic display image may be compared and verified with some or all of the electronic inputs; and storing the electronic inputs and the integrated electronic version in a database so that the electronic inputs and the integrated electronic version is accessible and transferable through a transfer system such as to one or more systems remote from the primary physical document and the one or more other documents retained in the hard copy form to provide the backup.

* * * * *

UNITED STATES PATENT AND TRADEMARK OFFICE
CERTIFICATE OF CORRECTION

PATENT NO. : 6,674,426 B1 Page 1 of 1
DATED : January 6, 2004
INVENTOR(S) : McGee et al.

It is certified that error appears in the above-identified patent and that said Letters Patent is hereby corrected as shown below:

Title page,
Item [75], Inventors, please replace "David R. McGee, Pasco, WA (US); Philip R. Cohen, Lake Oswego, OR (US); Lizhong Wu, San Diego, CA (US)" with -- David R. McGee, Pasco, WA (US); Philip R. Cohen, Lake Oswego, OR (US); Lizhong Wu, San Diego, CA (US); Matt Wesson, Portland OR, (US) --.

Signed and Sealed this

Fourth Day of May, 2004

JON W. DUDAS
*Acting Director of the United States Patent and Trademark Office*